United States Patent
Zhang et al.

(10) Patent No.: US 8,898,712 B2
(45) Date of Patent: Nov. 25, 2014

(54) METHOD AND APPARATUS FOR RECEIVING MULTIMEDIA SERVICE AND AIDING THE RECEIPT OF MULTIMEDIA SERVICE

(75) Inventors: Qingshan Zhang, Shanghai (CN); Songwei Ma, Shanghai (CN); Renxiang Yan, Shanghai (CN); Haibo Wen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 694 days.

(21) Appl. No.: 12/451,331

(22) PCT Filed: Feb. 4, 2008

(86) PCT No.: PCT/CN2008/000303
§ 371 (c)(1),
(2), (4) Date: Nov. 6, 2009

(87) PCT Pub. No.: WO2008/148282
PCT Pub. Date: Dec. 11, 2008

(65) Prior Publication Data
US 2010/0100908 A1      Apr. 22, 2010

(30) Foreign Application Priority Data
Jun. 6, 2007   (CN) .......................... 2007 1 0041689

(51) Int. Cl.
*H04N 7/173*       (2011.01)
*H04N 21/482*     (2011.01)
*H04N 21/658*     (2011.01)
*H04N 21/643*     (2011.01)
*H04N 21/84*       (2011.01)
*H04N 21/434*     (2011.01)
*H04N 21/6405*   (2011.01)
*H04L 29/12*       (2006.01)
*H04N 21/262*     (2011.01)

(52) U.S. Cl.
CPC ....... *H04N 7/17309* (2013.01); *H04N 21/4821* (2013.01); *H04N 21/6582* (2013.01); *H04N 21/64322* (2013.01); *H04N 21/84* (2013.01); *H04N 21/4345* (2013.01); *H04N 21/6405* (2013.01); *H04L 61/2069* (2013.01); *H04N 21/26283* (2013.01); *H04L 29/12292* (2013.01)
USPC .................. 725/91; 725/37; 725/38; 725/51; 725/86; 725/87; 725/93; 725/114; 725/116; 725/146; 709/229; 709/245; 370/389; 370/390

(58) Field of Classification Search
USPC ............ 725/110, 109, 114, 118, 93; 709/229, 709/245; 370/389, 390
See application file for complete search history.

(56) References Cited

U.S. PATENT DOCUMENTS

| | | |
|---|---|---|
| 2003/0106065 A1 | 6/2003 | Sakai et al. |
| 2006/0117342 A1 | 6/2006 | Park et al. |
| 2008/0301744 A1* | 12/2008 | Hutchings ..................... 725/110 |
| 2010/0100908 A1* | 4/2010 | Zhang et al. .................... 725/51 |

FOREIGN PATENT DOCUMENTS

CN           1 283 823          2/2001

* cited by examiner

*Primary Examiner* — Jun Fei Zhong
(74) *Attorney, Agent, or Firm* — Harness, Dickey & Pierce

(57) ABSTRACT

The invention provides a new solution for multimedia service guides, so as to aid the user equipment to receive multimedia service. The multimedia service management device notifies a service identifier and a service address of the multimedia service to a network server, and notifies the service identifier of the multimedia service to multimedia service guide device. Multimedia service guide device generates multimedia service guides comprising service identifier. After the user equipment obtains the multimedia service guides, it queries the network server for the service address corresponding to the multimedia service according to the service identifier comprised in the multimedia service guides, and obtains the multimedia service according to the service address.

24 Claims, 12 Drawing Sheets

METHOD AND APPARATUS FOR RECEIVING MULTIMEDIA SERVICE AND AIDING THE RECEIPT OF MULTIMEDIA SERVICE

FIELD OF THE INVENTION

The present invention relates to the telecommunication network, and particularly to the method and device for aiding the user equipment to receive multimedia service and the method and device for the user equipment to receive multimedia service.

BACKGROUND OF THE INVENTION

In current multicast services, when ICP (Internet Content Provider) or multimedia service provider wants to send multimedia service (for example, IPTV operator wants to broadcast a TV channel), it first needs to request the multimedia service management device of the NSP (Network Service Provider) to allocate a multicast network address for the multimedia service for its transmission. Multimedia service guide device (or EPG Server, Electronic Program Guide Server, which is usually provided by ICP) generates multimedia service guides (or program guides) according to the multicast network address allocated by the multimedia service management device and the description of the multimedia service content, etc. When the user equipment wants to receive multimedia service, it first receives multimedia service guides for various kinds of multimedia services provided by ICP from the multimedia service guide device, and for one multimedia service, the multimedia service guides comprise the name of the multimedia service, the description of the multimedia service content, and the multicast network address corresponding to the multimedia service, etc, and the name of the multimedia service, the description of the multimedia service content, etc, are displayed on the screen. The user chooses the multimedia service he/she wants to access according to the name of the multimedia service, the description of the multimedia service content, etc. displayed on the screen, and the user equipment joins the multicast group corresponding to the multicast network address of the multimedia service according to the multimedia service chosen by the user that he/she wants to access, so as to receive the multimedia service which is displayed on the screen.

FIG. 1 illustrates the network topological diagram for the user equipment to receive the multimedia service via the multimedia service guides in the prior art. User equipment is located in the user network, multimedia service management device is located in the NSP network and multimedia service guide device and multimedia service server are located in the ICP network. FIG. 2 illustrates the flowchart of the systematic method for the user equipment to receive multimedia service via multimedia service guides shown in the network topology in FIG. 1. First, in step a1, multimedia service management device notifies the multicast network address allocated for multimedia service to multimedia service guide device via one or more routers, alternatively, it can also notifies the multicast network address allocated for multimedia service to the multimedia service server (the step is not shown in FIG. 2), or notifies the multimedia service server in other manner. The multimedia service guide device generates multimedia service guides according to the received multicast network address of the multimedia service and the description of the multimedia service content, etc. The description of the multimedia service content, etc. can be sent along with the multicast network address by the multimedia service management device, or can be obtained by the multimedia service guide device in other manner, for example, is pre-stored in the multimedia service guide device by ICP.

When the user equipment receives the multimedia service, first, in step b1, the user equipment sends the message to multimedia service guide device for requesting to receive multimedia service guides. Then, in step b2, user equipment receives the multimedia service guides from the multimedia service guide device. Then, in step b5, according to the multimedia service chosen by the user, user equipment joins the multicast group corresponding to the multicast network address of the chosen multimedia service, at last, in step b6, user equipment receives the multimedia service from the multimedia service server.

Since at present, the transmission of the multicast packet is basically based on IPv4 protocol, and the multicast network address resources (i.e., the IP multicast network address) are limited; therefore, when the multicast network address allocated for a certain multimedia service by the multimedia service management device is no longer in use, the multimedia service management device needs to retrieve the multicast network address to reallocate it for other multimedia service to use; therefore, multimedia service management device needs to adjust the allocation of multicast network address frequently. When the multimedia service management device reallocates the multicast network address, the contents of the multimedia service guides in the multimedia service guide device need to be adjusted accordingly, and the multimedia service guide device needs to frequently communicate with the multimedia service management device; For the user equipment, since the multicast network address of the multimedia service changes dynamically, the user equipment needs to frequently communicate with the multimedia service guide device so as to obtain the latest multicast network address of the multimedia service, which waste lots of network bandwidth.

SUMMARY OF THE INVENTION

The invention is proposed to solve the aforementioned problems in the existing technology. It proposes a new solution for multimedia service guides, so as to aid the user equipment to receive multimedia service. Multimedia service management device notifies the service identifier and service address of the multimedia service to network server, and notifies the service identifier of the multimedia service to multimedia service guide device. Multimedia service guide device generates multimedia service guides comprising service identifiers. After user equipment obtains the multimedia service guides from the multimedia service guide device, it queries the network server for the service address corresponding to the multimedia service according to the service identifier comprised in the multimedia service guides, and obtains the multimedia service according to the service address.

According to the first aspect of the invention, there is provided a method of aiding user equipment to obtain multimedia service in a multimedia service management device in the telecommunication network, comprising the following steps: c. notifying a service identifier and a service address of the multimedia service to a network server, and notifying said service identifier of the multimedia service to a multimedia service guide device.

Preferably, the method further comprises the following steps before step c: a. receiving, from a network device, an allocation request message for requesting service resources to be allocated for said multimedia service; b. allocating service address and/or said service identifier for said multimedia service according to said allocation request message; the method further comprises the following steps after step b:—sending said allocated service address and/or said service identifier to said network device.

According to the second aspect of the invention, there is provided a method of obtaining multimedia service in the user equipment in telecommunication network, comprising the following steps: i. sending a receiving request message to a multimedia service guide device for requesting to receive multimedia service guides; ii. receiving said multimedia service guides from the multimedia service guide device, said multimedia service guides comprising the service identifier of each multimedia service; iii. sending a first query message to network server according to the service identifier of the multimedia service chosen by the user, said first query message being used to query the service address corresponding to the service identifier of the chosen multimedia service; iv. receiving a first response message from said network server, said first response message comprising the service address corresponding to the service identifier of the chosen multimedia service; v. obtaining said chosen multimedia service according to said corresponding service address.

According to the third aspect of the invention, there is provided a method of sending multimedia service in multicast manner in multimedia service server in telecommunication network, comprising the following steps:—sending a second query message to network server, said second query message being used to query the multicast network address corresponding to the service identifier of the multimedia service; —receiving a second response message from the network server, said second response message comprising the multicast network address corresponding to the service identifier of the multimedia service; —transmitting said multimedia service using said multicast network address.

According to the fourth aspect of the invention, there is provided a method of providing multimedia service guides to a user equipment in multimedia service guide device in telecommunication network, comprising the following steps: A. receiving, from said user equipment, a receiving request message for requesting to receive multimedia service guides; B. sending multimedia service guides to said user equipment, said multimedia service guides comprising the service identifier of each multimedia service.

According to the fifth aspect of the invention, there is provided an aiding apparatus for aiding user equipment to obtain multimedia service in a multimedia service management device in the telecommunication network, comprising: notifying means, configured to notify a service identifier and a service address of the multimedia service to network server, and to notify said service identifier of the multimedia service to a multimedia service guide device.

Preferably, the aiding apparatus further comprising: a first receiving means, configured to receive, from a network device, an allocation request message for requesting service resources to be allocated for said multimedia service; an allocating means, configured to allocate said service address and/or said service identifier for said multimedia service according to said allocation request message; a first sending means, configured to send said allocated service address and/or said service identifier to said network device.

According to the sixth aspect of the invention, there is provided a service obtaining apparatus for obtaining multimedia service in the user equipment in telecommunication network, comprising: a second sending means, configured to send a receiving request message to a multimedia service guide device for requesting to receive multimedia service guides; a second receiving means, configured to receive multimedia service guides from the multimedia service guide device, said multimedia service guides comprising the service identifier of each multimedia service; a third sending means configured to send a first query message to a network server according to the service identifier of the multimedia service chosen by the user, said first query message being used to query the service address corresponding to the service identifier of the chosen multimedia service; a third receiving means configured to receive a first response message from said network server, said first response message comprising the service address corresponding to the service identifier of the chosen multimedia service; obtaining means configured to obtain said chosen multimedia service according to said corresponding service address.

According to the seventh aspect of the invention, there is provided a service sending apparatus for sending multimedia service in multicast manner in multimedia service server in telecommunication network, comprising: a fourth sending means configured to send a second query message to a network server, said second query message being used to query the multicast network address corresponding to the service identifier of the multimedia service; a fourth receiving means configured to receive a second response message from the network server, said second response message comprising the multicast network address corresponding to the preset service identifier of the multimedia service; multicast transmitting means configured to transmit said multimedia service using said multicast network address.

According to the eighth aspect of the invention, there is provided a guide providing apparatus for providing multimedia service guides to user equipment in multimedia service guide device in telecommunication network, comprising: a fifth receiving means configured to receive from the user equipment a receiving request message for requesting to receive multimedia service guides; a fifth sending means configured to send multimedia service guides to said user equipment, said multimedia service guides comprise the service identifier of each multimedia service.

With the use of the method and device provided by the present invention, the multimedia service management device (usually provided by NSP) can reallocate service address more conveniently. Since the service identifier of the multimedia service is usually fixed, when the multimedia service management device reallocates the service address, it only needs to notify the change of the service address corresponding to the service identifier of the multimedia service to the network server (usually provided by NSP) of the NSP, with no need to notify multimedia service guide device (usually provided by ICP), i.e., when the multimedia service management device reallocates the service address, multimedia service guide device does not need to update the contents of multimedia service guides. The user equipment does not need to communicate frequently with multimedia service guide device. Besides, before the multimedia service server sends multimedia service, it can query network server for the service address corresponding to the service identifier of the multimedia service, so as to send the multimedia service, therefore, when the multimedia service management device reallocates the service address, it does not need to inform multimedia service server.

BRIEF DESCRIPTION OF THE DRAWINGS

Other features, aspects and advantages of the present invention will become obvious by reading the following description of the non-limited embodiments with the aid of appended drawings. Wherein, same or similar reference numerals refer to the same or similar steps or means.

DETAILED DESCRIPTION OF EMBODIMENTS

Figure 1:
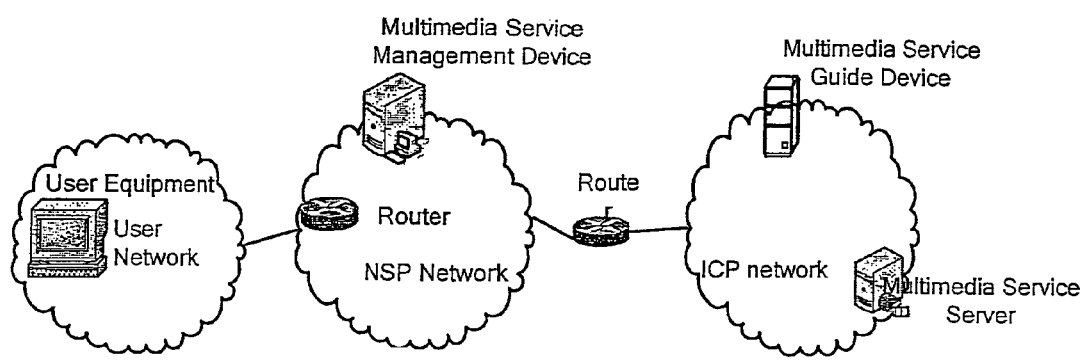
FIG. 1 the network topological diagram of the user equipment to receive the multimedia service via the multimedia service guides in the prior art.
Figure 2:
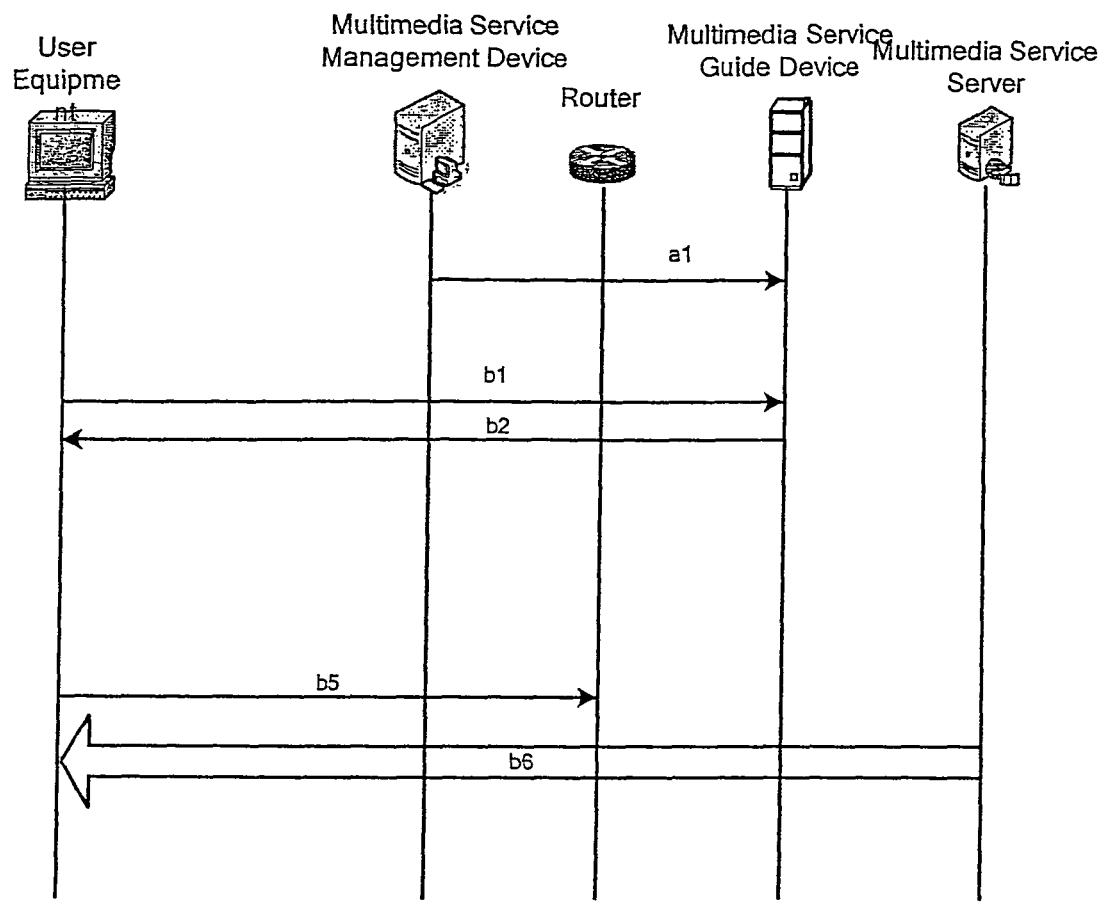
FIG. 2 is the flow chart for the systematic method of the user equipment to receive the multimedia service via the multimedia service guides in the prior art.
Figure 3:
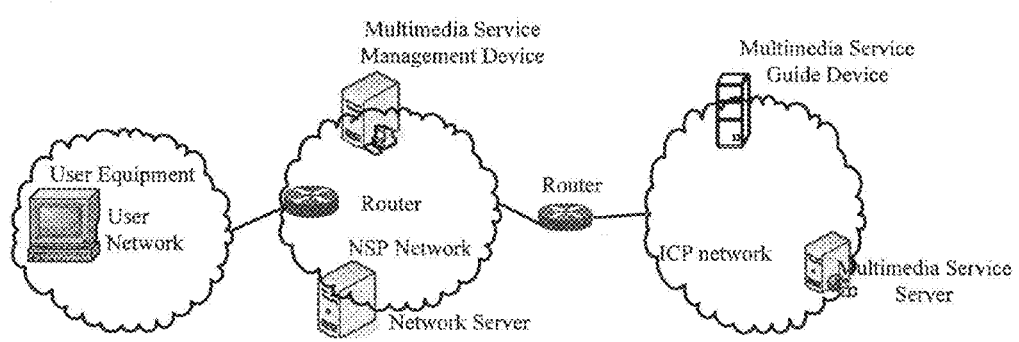
FIG. 3 is the network topological diagram of the user equipment to receive multimedia service via multimedia service guides according to an embodiment of the present invention.

FIG. 3 is the network topological diagram of the user equipment to receive multimedia service via multimedia service guides according to an embodiment of the present invention. User equipment is located in the user network, multimedia service management device and network server are located in the NSP network, and multimedia service guide device and multimedia service server are located in the ICP network. Different from the topology shown in FIG. 1, a network server is added to the NSP network shown in FIG. 3.

Figure 4:
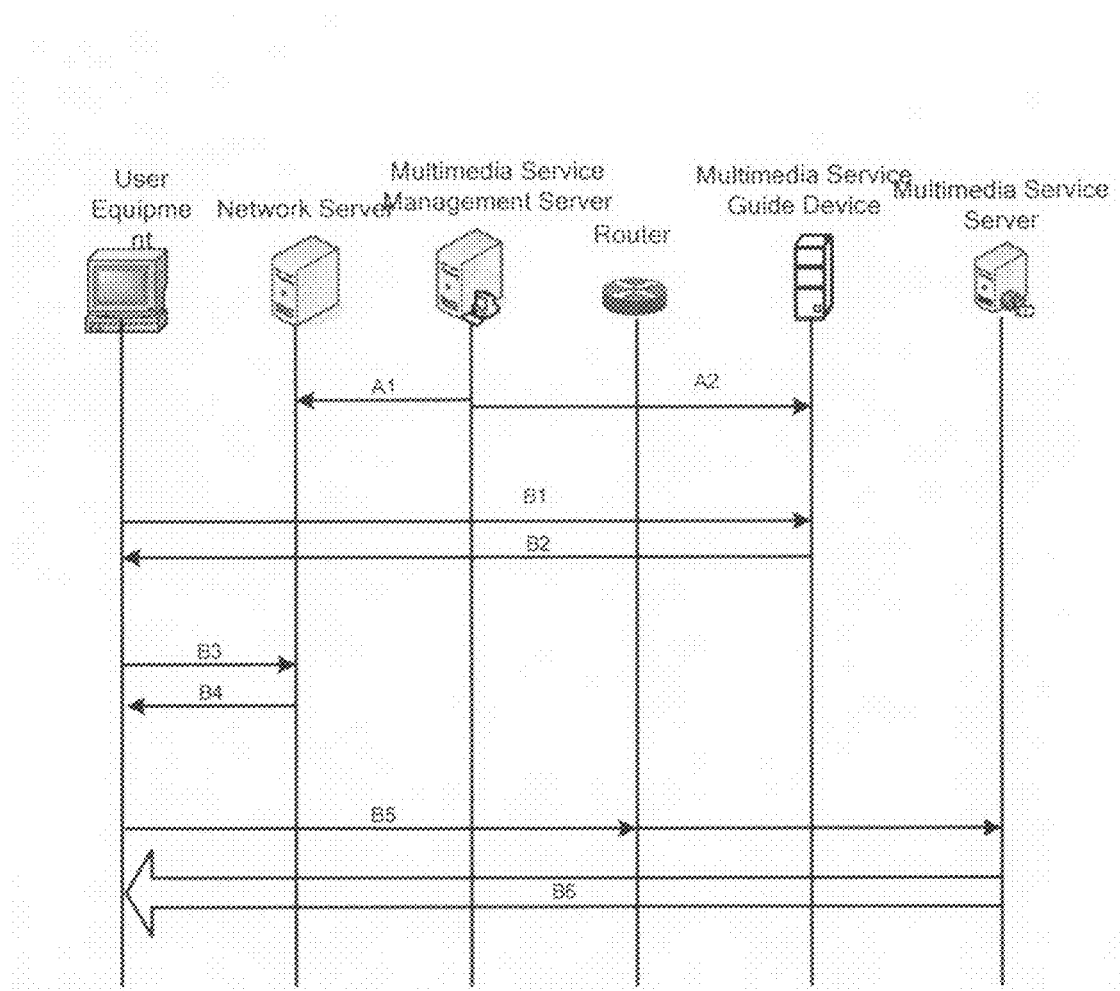
FIG. 4 is the flow chart for the systematic method of the user equipment to receive the multimedia service via the multimedia service guides according to an embodiment of the invention.

FIG. 4 shows the flow chart for the systematic method of the user equipment to receive the multimedia service via the multimedia service guides in the network topology shown in FIG. 3.

First, in step A1, multimedia service management device notifies the service identifier and corresponding service address of the multimedia service to network server, and notifies the service identifier of the multimedia service to the multimedia service guide device via one or more routers in step A2, here, the order of steps A1 and A2 does not matter. The service identifier and service address of the multimedia service may be allocated by the multimedia service management device at the request of multimedia service server or other network device, or be obtained in other manners. For example, the service identifier may be set by ICP. When the multimedia service server sends the multimedia service in unicast manner, the service address can also be the unicast network address of the multimedia service server itself. When the multimedia service management device allocates service identifier and/or service address at the request of multimedia service server or other network device, it further needs to notify the allocated service identifier and/or service address of the multimedia service to the multimedia service server or other network device.

Multimedia service guide device generates multimedia service guides according to the received service identifier and the content description of the multimedia service, etc. The description of the multimedia service content, etc can be sent along with the multicast network address by the multimedia service management device, or can be obtained in other manner by the multimedia service guide device, said other manner comprises but not limited to the manner of being prestored in the multimedia service guide device by ICP. Said multimedia service guides comprise the service identifier of each multimedia service.

When the user equipment receives the multimedia service, first, in step B1, the user equipment sends the message to multimedia service guide device for requesting to receive multimedia service guides; then, in step B2, the user equipment receives the multimedia service guides from the multimedia service guide device.

Then, in step B3, the user equipment sends a first query message to query the service address corresponding to the service identifier of the multimedia service according to the service identifier of one multimedia service chosen by the user in the multimedia service guides; in step B4, user equipment receives a first response message from the network server, the first response message comprising the service address corresponding to the service identifier of the multimedia service.

Then, if the service address is a multicast network address, then in step B5, the user equipment joins the multicast group corresponding to the multicast network address. At last, in step B6, the user equipment receives the multimedia service from the multimedia service server. For the network topology based on IP protocol, the user equipment sends IGMP (Internet Group Management Protocol, for IPv4 protocol) report message or MLD (Multicast Listener Discovery, for IPv6 protocol) report message to the router nearest to the user equipment to join the multicast group. If PIM-SM protocol is running on the router, then after the router receives IGMP report message or MLD report message, it sends a joining message for joining the multicast group to the previous-hop router in the direction towards the root node of the multicast tree. After joining the multicast group, the router receives corresponding multimedia service, and forwards the multimedia service to the user equipment. The specific process for multicast communication can refer to IGMP protocol (RFC2236) or MLD protocol (RFC2710) and multicast communication protocol (such as PIM-SM protocol), the details of which will not be discussed in present invention.

If the service address is a unicast network address, then in step B5, the user equipment sends a service receiving request message for receiving multimedia service to the multimedia service server corresponding to the unicast network address, then in step B6, the user equipment receives the multimedia service from the multimedia service server.

For the multimedia service sent in multicast manner, if the multimedia service server only knows the service identifier of the multimedia service, before sending the multimedia service, the multimedia service server also needs to query the network server for the service address corresponding to the service identifier of the multimedia service, so as to transmit the multimedia service.

For the network topology based on IP protocol, the service identifier of the multimedia service comprises domain name or other identifier that can uniquely represent the multimedia service. The service address comprises unicast network address (i.e., unicast IP address) and multicast network address (i.e., multicast IP address), the network server is domain name server.

It should be noted that, the multimedia services of the present invention comprise but are not limited to audio video services such as network TV program, remote teaching, remote video conference, network broadcast, etc. ICP is not limited to multimedia service operator, it can also include personal multimedia service provider.

Figure 5:
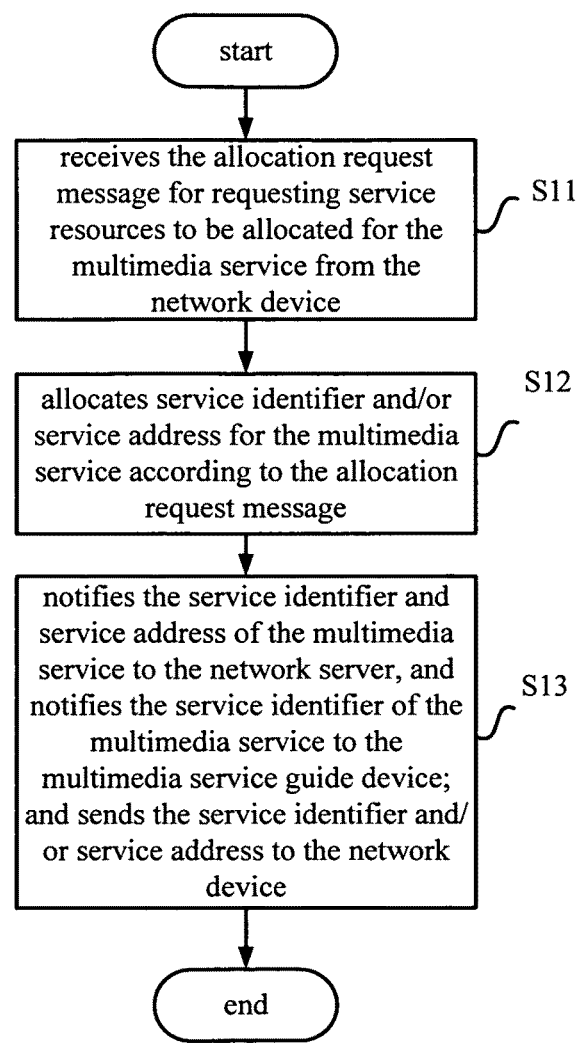
FIG. 5 is the flow chart of the method in the multimedia service management device in the telecommunication network for aiding the user equipment to obtain multimedia service according to an embodiment of the invention.

FIG. 5 is the flow chart of the method in the multimedia service management device in the telecommunication network for aiding the user equipment to obtain multimedia service according to an embodiment of the present invention.

First, in step S11, multimedia service management device receives the allocation request message for requesting service resources to be allocated for the multimedia service from the network device, here, the network device can be any network device that can communicate with multimedia service management device, it comprises but is not limited to multimedia service server, which is usually located in ICP network. Service resources comprise service identifier and/or service address. For the network topology based on IP protocol, service identifier comprises domain name or other identifier that can uniquely represent the multimedia service, and the service address comprises multicast IP address and unicast IP address.

Then, in step S12, the multimedia service management device allocates service address and/or service identifier for the multimedia service according to the allocation request message. To be specific, the allocation process can fall into the following three categories: 1) ICP has already set the service identifier of multimedia service, therefore, the multimedia service management device only allocates service address; 2) ICP has already obtained the service address of the multimedia service, therefore, the multimedia service management device only allocates service identifier; 3) the multimedia service management device allocates service identifier and service address for the multimedia service.

Usually, for the multimedia service sent in unicast manner, the unicast address of the multimedia service server itself can be used to send multimedia service. Meanwhile, the network device does not need to request the multimedia service management device to allocate service address for the multimedia service. The multimedia service management device can allocate a complete service identifier for the multimedia service according to the description of multimedia service content comprised in the allocation request message or partial designated content for the service identifier comprised in the allocation request message. For example, for the network topology based on IP protocol, when the IPTV operator wants to broadcast a music program, the allocation request message which is sent to the multimedia service management device by the network device comprises the description that the program is a music program, or the first character string of the domain in the allocation request message is designated as "music", and the allocation request message can further comprise the information related to the IPTV operator, such as the domain name of the known Website, etc. The multimedia service management device can allocate a domain name for the multimedia service according to the description of the program content and the information related to the IPTV operator. For example, when the CCTV wants to broadcast a music channel, it can allocate the domain name of "music.cctv.com.cn" as the service identifier for the channel.

For the multimedia service sent in multicast manner, service address is needed to be allocated for the multimedia service to carry the transmission of multimedia service. The service identifier corresponding to the multimedia service can be completely or partially designated by ICP, or can be allocated for the multimedia service by the multimedia service management device according to the related information such as description of multimedia service content.

At last, in step S13, the multimedia service management device notifies the service identifier and service address of the multimedia service to the network server, and notifies the service identifier of the multimedia service to the multimedia service guide device; and sends the service address and/or service identifier to the network device.

If the ICP has already preset the service identifier of the multimedia service, the multimedia service management device only needs to allocate service address for the multimedia service, and then notifies the service address allocated for the multimedia service and the preset service identifier to the network server; notifies the preset service identifier to multimedia service guide device; and sends the allocated service address to said network device.

If the ICP has already obtained the service address of the multimedia service, the multimedia service management device only needs to allocates service identifier for the multimedia service, and then notifies the service identifier allocated for the multimedia service and the service address obtained by ICP to the network server; notifies the allocated service identifier to the multimedia service guide device; and sends the allocated service identifier to said network device.

If the multimedia service neither has preset service identifier nor obtains service address in advance, the multimedia service management device allocates service identifier and service address for the multimedia service, then notifies the allocated service identifier and service address to the network server; notifies the allocated service identifier to multimedia service guide device; and sends the allocated service identifier and service address to said network device.

For the multimedia service sent in unicast manner, the unicast network address of the multimedia service server itself can be used to send the multimedia service, the multimedia service management device does not need to allocate service address for the multimedia service, and the service identifier of the multimedia service can also be set in advance, therefore, steps S11 to S13 are not necessary steps for present invention, which are described here only as a preferred embodiment.

Figure 6:
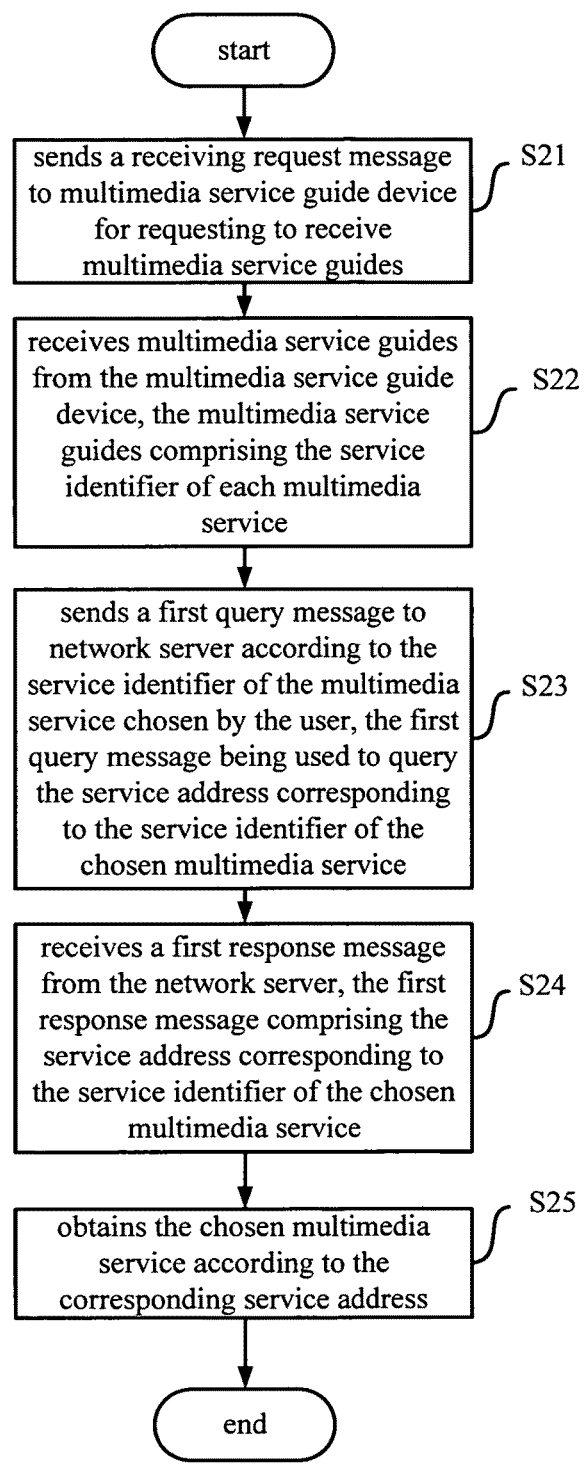
FIG. 6 is the flow chart of the method in the user equipment in the telecommunication network for obtaining multimedia service according to an embodiment of the invention.

FIG. 6 is the flow chart of the method in the user equipment in the telecommunication network for obtaining multimedia service according to an embodiment of the present invention.

First, in step S21, the user equipment sends a receiving request message to multimedia service guide device for requesting to receive multimedia service guides.

Then, in step S22, the user equipment receives multimedia service guides from the multimedia service guide device, the multimedia service guides comprise the service identifier of each multimedia service.

Subsequently, in step S23, the user equipment sends a first query message to network server according to the service identifier of the multimedia service chosen by the user, the first query message being used to query the service address corresponding to the service identifier of the chosen multimedia service. For the network topology based on IP protocol, the network server is domain name server, the service identifier comprises domain name or other identifier that can uniquely represent the multimedia service, the service address is IP address, which comprises unicast IP address and multicast IP address. The user equipment sends DNS query message to domain name server to query the IP address corresponding to the domain name of the multimedia service chosen by the user.

Then, in step S24, the user equipment receives a first response message from the network server, the first response message comprises the service address corresponding to the service identifier of the chosen multimedia service.

At last, in step S25, the user equipment obtains the chosen multimedia service according to the corresponding service address. If the corresponding service address is multicast network address, the user equipment joins the multicast group corresponding to the multicast network address in order to obtain the chosen multimedia service. For the network topology based on IP protocol, the user equipment sends IGMP (IPv4) report message or MLD (IPv6) report message to the router nearest to the user equipment. The specific process for multicast communication can refer to IGMP protocol (RFC2236) or MLD protocol (RFC2710) and multicast communication protocol (such as PIM-SM protocol), the details of which will not be discussed in present invention. When the corresponding service address is unicast network address, the user equipment communicates with the server corresponding to the unicast network address so as to obtain the chosen multimedia service.

Figure 7:
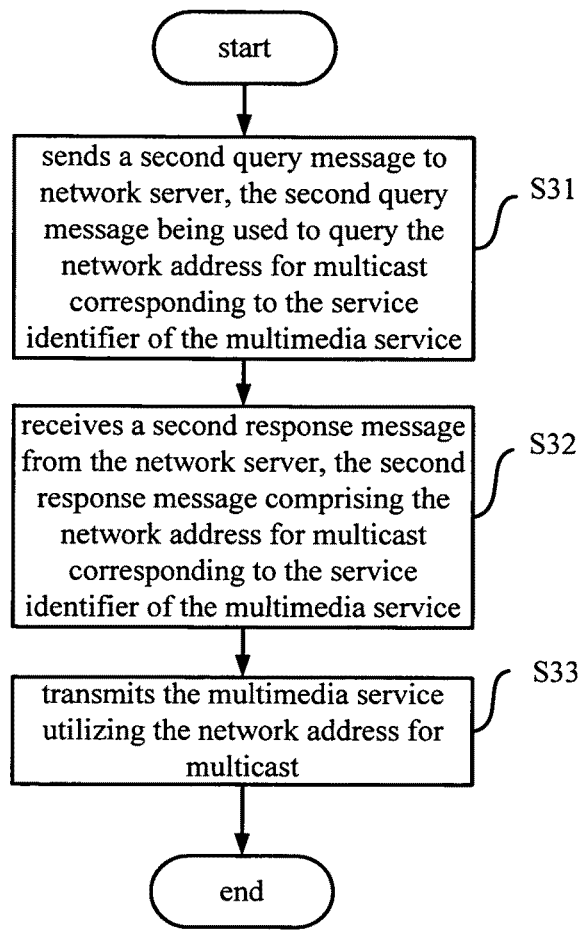
FIG. 7 is the flow chart of the method in the multimedia service server in the telecommunication network for sending multimedia service in multicast manner according to an embodiment of the invention.

FIG. 7 illustrates the flow chart of the method in the multimedia service server in the telecommunication network for sending multimedia service in multicast manner according to an embodiment of the invention.

First, in step 31, the multimedia service server sends a second query message to network server, the second query message being used to query the multicast network address corresponding to the service identifier of the multimedia service.

Then, in step S32, the multimedia service server receives a second response message from the network server, and the second response message comprises the multicast network address corresponding to the service identifier of the multimedia service.

At last, in step S33, the multimedia service server transmits the multimedia service utilizing the multicast network address.

For the network topology based on IP protocol, the service identifier comprises domain name or other identifier that can uniquely represent the multimedia service, the network server is domain name server, the multicast network address is multicast IP address. The multimedia service server sends DNS query message to domain name server to query the IP address corresponding to the domain name of the multimedia service chosen by the user, i.e., the multicast IP address, then transmits the multimedia service utilizing the multicast IP address.

Figure 8:
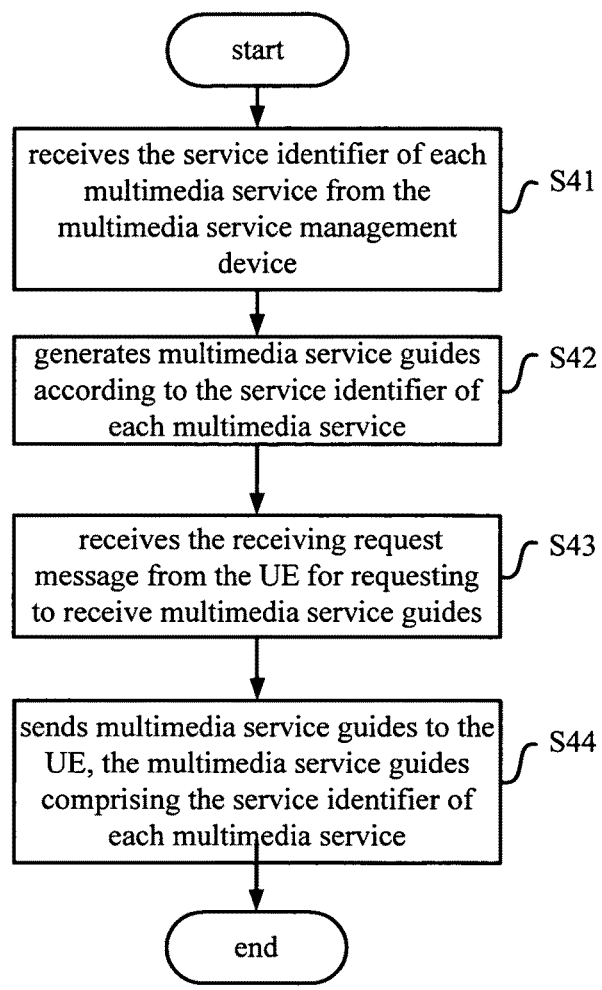
FIG. 8 is the flow chart of the method in the multimedia service guide device in the telecommunication network for providing the user equipment with multimedia service guides according to an embodiment of the invention.

FIG. 8 is the flow chart of the method in the multimedia service guide device in the telecommunication network for providing the user equipment with multimedia service guides according to an embodiment of the present invention.

Since the multimedia service guides can also be prestored in the multimedia service guide device by the ICP, therefore, when the multimedia service guide device receives the receiving request message for requesting to receive multimedia service guides from the user equipment, it can send the prestored multimedia service guides to user equipment. Preferably, the multimedia service guides can be generated by the multimedia service guide device after it has received the service identifier of each multimedia service sent by multimedia service management device. FIG. 8 shows the flow chart of the method of the preferred embodiment.

First, in step S41, the multimedia service guide device receives the service identifier of each multimedia service from the multimedia service management device. For the network topology based on IP protocol, the service identifier comprises domain name or other identifier that can uniquely represent the multimedia service.

Then, in step S42, the multimedia service guide device generates multimedia service guides according to the service identifier of each multimedia service. Of course, the multimedia service guides also comprise other information such as the description of the content of each multimedia service, such other information can be sent along with the service identifier by the multimedia service management device, or can be obtained in other manner by the multimedia service guide device, said other manner comprises but is not limited to being pre-stored in the multimedia service guide device by ICP.

Then, in step S43, multimedia service guide device receives the receiving request message from the user equipment for requesting to receive multimedia service guides.

At last, in step S44, the multimedia service guide device sends multimedia service guides to the user equipment, and the multimedia service guides comprise the service identifier of each multimedia service.

It should be explained that, since multimedia service guides can be stored in the multimedia service guide device in advance by ICP, therefore, steps S41 and S42 are not necessary steps in the present invention, which are described here as a preferred embodiment.

The method flow chart shown in FIG. 8 only illustrates the flow chart of the multimedia service guide device generates the multimedia service guides for the first time or sends the multimedia service guides to the user equipment for the first time after the content of multimedia service guides has been updated. For the subsequent receipt of the receiving request message from other UEs for requesting to receive multimedia service guides, the multimedia service guide device directly sends the multimedia service guides generated in step S42 to other UEs. Of course, if the multimedia services provided by ICP increase or decrease, multimedia service guide device needs to update the contents of the multimedia service guides and notifies the update to each user equipment; or each user equipment periodically or aperiodically requests the multimedia service management device for updating the multimedia service guides.

Figure 9:
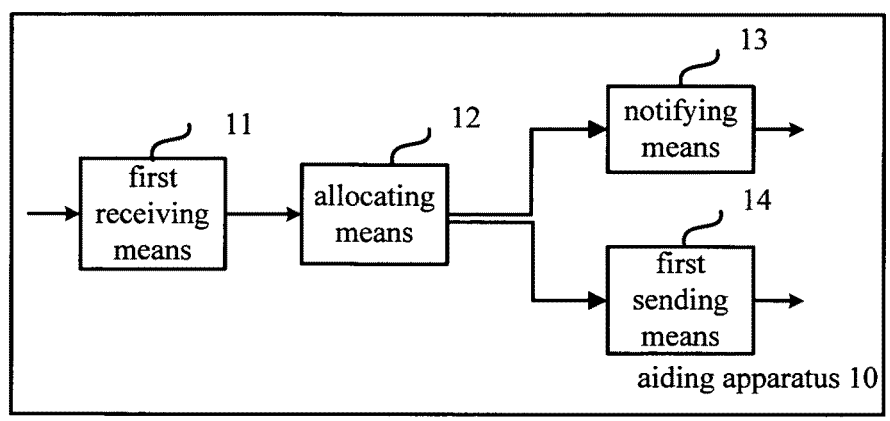
FIG. 9 is the block diagram of the aiding apparatus in the multimedia service management device in the telecommunication network for aiding the user equipment to obtain multimedia service according to an embodiment of the invention.

FIG. 9 illustrates the block diagram of the aiding apparatus in the multimedia service management device in the telecommunication network for aiding the UE to obtain multimedia service according to an embodiment of the present invention. The aiding apparatus 10 comprises a first receiving means 11, an allocating means 12, a notifying means 13 and a first sending means 14. For simplicity, the aiding apparatus 10 comprises other sub means related to the preferred embodiments. With the teaching of the present invention, those skilled in the art can understand that only the notifying means 13 is the necessary means for the implementation of the present invention, and other sub means are optional.

For the multimedia service sent in unicast manner, the multimedia service can be sent via the unicast network address of the multimedia service server itself, therefore, the multimedia service management device does not need to allocate service address for the multimedia service, and the service identifier of the multimedia service can also be set in advance. Therefore, the service address and service identifier corresponding to the multimedia service can be prestored in notifying means 13, and notifying means 13 notifies the service address and service identifier of the multimedia service to network server, and sends the service identifier of the multimedia service to multimedia service guide device.

For the multimedia service sent in multicast manner, preferably, multimedia service management device can allocate service address and/or service identifier for the multimedia service. Of course, service identifier can be set by ICP in advance.

First, the first receiving means 11 receives the allocation request message for requesting service resources to be allocated for the multimedia service from the network device, here, the network device can be any network device that can communicate with multimedia service management device, and it comprises but is not limited to multimedia service server, which is usually located in ICP network. Service resources comprise service identifier and/or service address. For the network topology based on IP protocol, service identifier comprises domain name, and the service address comprises multicast IP address and unicast IP address.

Then, the allocating means 12 allocates service address and/or service identifier to the multimedia service according to the allocation request message. To be specific, the allocation process can fall into the following three categories: 1) ICP has already set the service identifier of multimedia service, therefore, the multimedia service management device only allocates service address; 2) ICP has already obtained the service address of the multimedia service, therefore, the multimedia service management device only allocates service identifier; 3) the multimedia service management device allocates service identifier and service address for the multimedia service.

Usually, for the multimedia service sent in unicast manner, the multimedia service can be sent with the unicast address of the multimedia service server itself. Meanwhile, the network device does not need to request the multimedia service management device to allocate service address for the multimedia service. The multimedia service management device can allocate a complete service identifier for the multimedia service according to the description of multimedia service content comprised in the allocation request message or partial designated content of the service identifier comprised in the allocation request message. For example, for the network topology based on IP protocol, when the IPTV operator wants to broadcast a music program, the allocation request message which is sent to the multimedia service management device by the network device comprises the description that the program is a music program, or the first character string of the domain in the allocation request message is designated as "music", and the allocation request message can further comprises the information related to the IPTV operator, information such as the domain name of the known Web site. The multimedia service management device can allocate a domain name for the multimedia service according to the description of the program content and the information related to the IPTV operator. For example, when the CCTV wants to broadcast a music channel, it can allocate the domain name of "music.cctv.com.cn" as service identifier for the channel.

For the multimedia service sent in multicast manner, service address is needed to be allocated for the multimedia service to carry the transmission of multimedia service. The service identifier corresponding to the multimedia service can be completely or partially designated by ICP, or can be allocated for the multimedia service by the multimedia service management device according to the related information such as description of multimedia service content.

At last, the notifying means 13 notifies the service identifier and service address of the multimedia service to the network server, and notifies the service identifier of the multimedia service to the multimedia service guide device. The first sending means 14 sends the service address and/or service identifier to the network device.

If the ICP has already set the service identifier of the multimedia service, the allocating means 12 only needs to allocate service address for the multimedia service, and then notifying means 13 notifies the service address allocated for the multimedia service and the preset service identifier to the network server and notifies the preset service identifier to multimedia service guide device; the first sending means 14 sends the allocated service address to said network device.

If the ICP has already obtained the service address of the multimedia service, the allocating means 12 only needs to allocate service identifier for the multimedia service; and then notifying means 13 notifies the service identifier allocated for the multimedia service and the service address obtained by ICP to the network server and notifies the allocated service identifier to the multimedia service guide device; the first sending means 14 sends the allocated service identifier to said network device.

If the multimedia service neither has preset service identifier nor obtains service address in advance, the allocating means 12 allocates service identifier and service address for the multimedia service, then notifying means 13 notifies the allocated service identifier and service address to the network server and notifies the allocated service identifier to multimedia service guide device; the first sending means 14 sends the allocated service identifier and service address to said network device.

Figure 10:
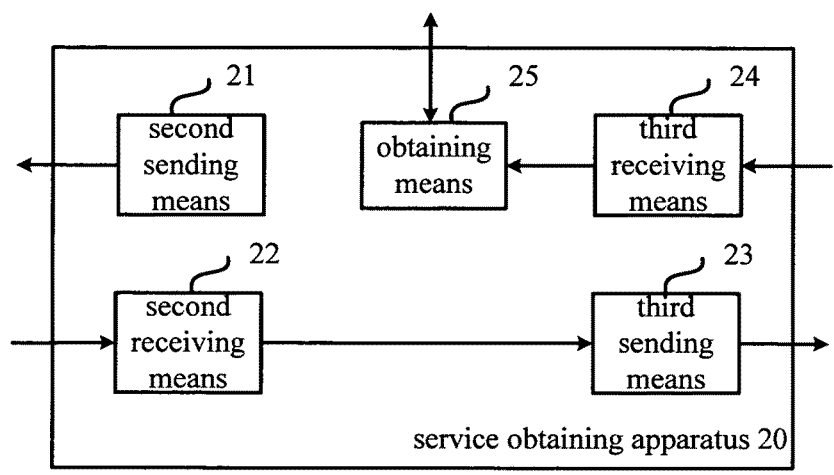
FIG. 10 is the block diagram of the service obtaining apparatus in the user equipment in the telecommunication network for obtaining multimedia service according to an embodiment of the invention.

FIG. 10 is the block diagram of the service obtaining apparatus in the UE in the telecommunication network for obtaining multimedia service according to an embodiment of the present invention. The service obtaining apparatus 20 comprises a second sending means 21, a second receiving means 22, a third sending means 23, a third receiving means 24 and an obtaining means 25.

Firstly, the second sending means 21 sends a receiving request message to multimedia service guide device for requesting to receive multimedia service guides.

Then, a second receiving means 22 receives multimedia service guide from the multimedia service guide device, the multimedia service guide comprises the service identifier of each multimedia service.

Consequently, the third sending means 23 sends a first query message to network server according to the service identifier of the multimedia service chosen by the user, the first query message being used to query the service address corresponding to the service identifier of the chosen multimedia service. For the network topology based on IP protocol, the network server is domain name server, the service identifier comprises domain name or other identifier that can uniquely represent the multimedia service, the service address is IP address, The UE sends DNS query message to domain name server to query the IP address corresponding to the domain name of the multimedia service chosen by the user, and the IP address comprises unicast IP address and multicast IP address.

Then, the third receiving means 24 receives a first response message from the network server, the first response message comprising the service address corresponding to the service identifier of the chosen multimedia service.

At last, an obtaining means 25 obtains the chosen multimedia service according to the corresponding service address. If the corresponding service address is multicast network address, the obtaining means 25 joins the multicast group corresponding to the multicast network address in order to obtain the chosen multimedia service. To be specific, for the network topology based on IP protocol, the obtaining means 25 sends IGMP (IPv4) report message or MLD (IPv6) report message to the router nearest to the UE, so as to join the multicast group. The specific process for multicast communication can refer to IGMP protocol (RFC2236) or MLD protocol (RFC2710) and multicast communication protocol (such as PIM-SM protocol), the details of which will not be discussed in present invention. When the corresponding service address is unicast network address, the obtaining means 25 communicates with the server corresponding to the unicast network address so as to obtain the chosen multimedia service.

Figure 11:
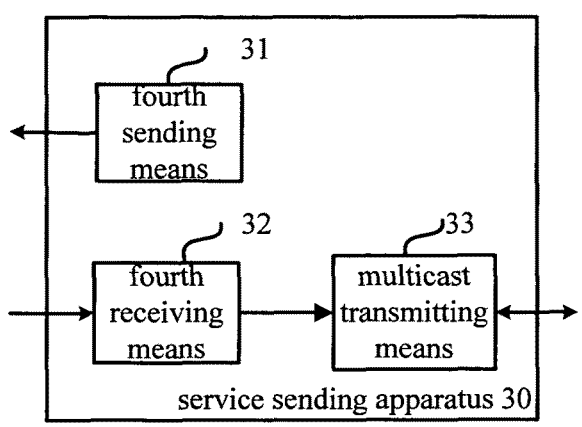
FIG. 11 is the block diagram of the service sending apparatus in the multimedia service server in the telecommunication network for sending multimedia service in multicast manner according to an embodiment of the invention.

FIG. 11 is the block diagram of the service sending apparatus in the multimedia service server in the telecommunication network for sending multimedia service in multicast manner according to an embodiment of the present invention. The service sending apparatus 30 comprises a fourth sending means 31, a fourth receiving means 32 and a multicast transmitting means 33.

Firstly, the fourth sending means 31 sends a second query message to network server, the second query message being used to query the multicast network address corresponding to the service identifier of the multimedia service.

Then, the fourth receiving means 32 receives a second response message from the network server, the second response message comprising the multicast network address corresponding to the service identifier of the multimedia service.

At last, the multicast transmitting means 33 transmits the multimedia service utilizing the multicast network address.

For the network topology based on IP protocol, the service identifier comprises domain name or other identifier that can uniquely represent the multimedia service, the network server is domain name server, the multicast network address is multicast IP address. The fourth sending means 31 sends DNS query message to domain name server to query the IP address corresponding to the domain name of the multimedia service chosen by the user, i.e., the multicast IP address, then the multicast transmitting means 33 transmits the multimedia service utilizing the multicast IP address in the DNS response message received by the fourth receiving means 32 from the domain name server.

Figure 12:
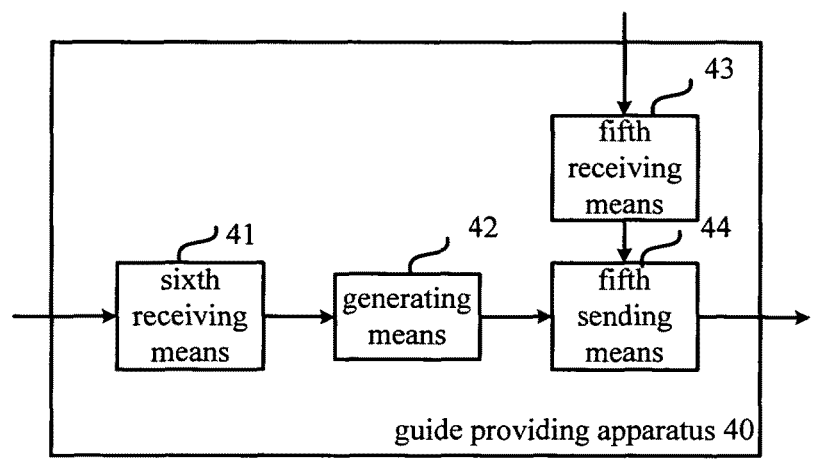
FIG. 12 is the block diagram of the guide providing apparatus in the multimedia service guide device in the telecommunication network for providing the user equipment with multimedia service guides according to an embodiment of the invention.

FIG. 12 is the block diagram of the guide providing apparatus in the multimedia service guide device in the telecommunication network for providing the UE with multimedia service guide according to an embodiment of the invention. The guide providing apparatus 40 comprises a sixth receiving means 41, a generating means 42, a fifth receiving means 43 and a fifth sending means 44. For simplicity, the guide providing apparatus comprises other sub means related to the preferred embodiments. With the teaching of the present invention, those skilled in the art can understand that only the fifth receiving means and fifth sending means 44 are the necessary means for the implementation of the present invention, and other sub means are optional.

Since the multimedia service guide can also be prestored in the multimedia service guide device by the ICP, therefore, when the fifth receiving means 43 receives the receiving request message for requesting to receive multimedia service guide from the UE, the sixth sending means 44 can send the prestored multimedia service guide to UE.

Preferably, the multimedia service guide can be generated by the multimedia service guide device after it has received the service identifier of each multimedia service sent by multimedia service management device.

Firstly, the sixth receiving means 41 receives the service identifier of each multimedia service from the multimedia service management device. For the network topology based on IP protocol, the service identifier comprises domain name or other identifier that can uniquely represent the multimedia service.

Then, the generating means 42 generates the multimedia service guide according to the service identifier of each multimedia service. Of course, the multimedia service guide also comprises other information such as the description of the content of each multimedia service, such other information can be sent along with the service identifier by the multimedia service management device, or can be obtained in other manner by the generating means 42, said other manner comprises but is not limited to being pre-stored in the multimedia service guide device by ICP.

Then, the fifth receiving means 43 receives the receiving request message from the UE for requesting to receive multimedia service guides.

At last, the fifth sending means 44 sends multimedia service guides to the UE, the multimedia service guides comprising the service identifier of each multimedia service.

The embodiments of the present invention have been described above. It is understandable by those skilled in the art that the present invention is not limited to the above specific embodiments, and various modifications or amendments can be made without departing from the scope and spirit of the scope of the attached claims.

What is claimed is:

1. A method of aiding user equipment to obtain multimedia service in a multimedia service management device in a telecommunication network, the method comprising:

notifying, by the multimedia service management device, a service identifier and a service address of the multimedia service to a network server of the telecommunication network, wherein the service identifier and the service address of the multimedia service is used to send a receiving request message to a multimedia service guide device for requesting to receive multimedia service guides, and to receive the multimedia service guides from the multimedia service guide device, the multimedia service guides including the service identifier of each multimedia service;

notifying, by the multimedia service management device, said service identifier of the multimedia service to the multimedia service guide device of the telecommunication network, wherein the service identifier is used to construct a multimedia service guide for each multimedia service by the multimedia service guide device, to send a first query message to the network server according to the service identifier of the multimedia service chosen by a user, the first query message being used to query the service address corresponding to the service identifier of the chosen multimedia service, and to receive a first response message from the network server, the first response message comprising the service address corresponding to the service identifier of the chosen multimedia service; and sending, by the network server of the telecommunication network, said service address to the user equipment in response to a query by the user equipment based on the service identifier provided by the multimedia service guide device.

2. A method according to claim 1, further comprising, before notifying the service identifier and the service address of the multimedia service to the network server:

receiving, from a network device, an allocation request message for requesting service resources to be allocated for said multimedia service; and allocating said service address, service identifier, or service address and service identifier for said multimedia service according to said allocation request message;

wherein after allocating said service address, service identifier, or service address and service identifier, the method further comprises:

sending said allocated service address, said service identifier, or the service address and service identifier to said network device.

3. A method according to claim 1, wherein said service address includes a unicast network address or a multicast network address, said service identifier comprises a domain name, and said network server comprises a domain name server.

4. A method according to claim 1, further comprising: obtaining said chosen multimedia service according to said corresponding service address.

5. A method according to claim 4, wherein said corresponding service address includes a multicast network address, and wherein said obtaining said chosen multimedia service further comprises:

joining a multicast group corresponding to the multicast network address so as to obtain said chosen multimedia service.

6. A method according to claim 4, wherein said corresponding service address includes a unicast network address, and wherein said obtaining said chosen multimedia service further comprises:

communicating with a server corresponding to the unicast network address so as to obtain said chosen multimedia service.

7. A method according to claim 4, wherein said service identifier includes a domain name, and said network server includes a domain name server.

8. A method according to claim 4, further comprising: sending a second query message to the network server, said second query message being used to query a multicast network address corresponding to the service identifier of the multimedia service;

receiving a second response message from the network server, said second response message including the multicast network address corresponding to the service identifier of the multimedia service; and transmitting said multimedia service using said multicast network address.

9. A method according to claim 8, wherein said service identifier includes a domain name, and said network server comprises a domain name server.

10. A method of providing multimedia service guides from a multimedia service guide device in a telecommunication network to user equipment in the telecommunication network, the method comprising:

notifying, by a network server of the telecommunication network from a multimedia service management device of the telecommunication network, a service address of a multimedia service in response to a query by the user equipment based on a service identifier provided by the multimedia service guide device, wherein the service identifier and the service address of the multimedia service is used to send a receiving request message to the multimedia service guide device for requesting to receive the multimedia service guides, and to receive the multimedia service guides from the multimedia service guide device, the multimedia service guides including the service identifier of each multimedia service;

receiving, by the multimedia service guide device from said user equipment, a receiving request message for requesting to receive the multimedia service guides, wherein the service identifier is used to construct a multimedia service guide for each multimedia service by the multimedia service guide device, to send a first query message to the network server according to the service identifier of the multimedia service chosen by a user, the first query message being used to query the service address corresponding to the service identifier of the chosen multimedia service, and to receive a first response message from the network server, the first response message comprising the service address corresponding to the service identifier of the chosen multimedia service; and sending, by the multimedia service guide device, the multimedia service guides to said user equipment, said multimedia service guides including the service identifier of each multimedia service.

11. A method according to claim 10, wherein the method further comprises, before receiving the receiving request message:

receiving the service identifier of each multimedia service from the multimedia service management device; and generating said multimedia service guides according to said service identifier of each multimedia service.

12. A method according to claim 10, wherein said service identifier includes a domain name.

13. An aiding apparatus for aiding user equipment to obtain multimedia service in a multimedia service management device in a telecommunication network, the aiding apparatus being an element of the multimedia service management device, the aiding apparatus comprising:

a first device configured to receive an allocation request message from the user equipment for requesting service resources to be allocated for the multimedia service;

a second device configured to allocate a service address, a service identifier, or the service address and the service identifier according to the allocation request message;

a third device configured to notify the service identifier and the service address of the multimedia service to a network server, wherein the service identifier and the service address of the multimedia service is used to send a receiving request message to a multimedia service guide device for requesting to receive multimedia service guides, and to receive the multimedia service guides from the multimedia service guide device, the multimedia service guides including the service identifier of each multimedia service, and also to notify said service identifier of the multimedia service to the multimedia service guide device, wherein the service identifier is used to construct a multimedia service guide for each multimedia service by the multimedia service guide device, to send a first query message to the network server according to the service identifier of the multimedia service chosen by a user, the first query message being used to query the service address corresponding to the service identifier of the chosen multimedia service, and to receive a first response message from the network server, the first response message comprising the service address corresponding to the service identifier of the chosen multimedia service; and a fourth device configured to send the allocated service address to the user equipment in response to a query by the user equipment based on the service identifier provided by the multimedia service guide device.

14. An apparatus according to claim 13, further comprising:
a fifth device configured to receive, from a network device, an allocation request message for requesting the service resources to be allocated for said multimedia service;
a sixth device configured to allocate at least one of said service address and said service identifier for said multimedia service according to said allocation request message; and
a seventh device configured to send at least one of said allocated service address and said service identifier to a network device.

15. An apparatus according to claim 13, wherein said service address includes a unicast network address or a multicast network address, said service identifier includes a domain name, and said network server includes a domain name server.

16. An apparatus according to claim 13, further comprising:
a fifth device configured to obtain said chosen multimedia service according to said corresponding service address.

17. An apparatus according to claim 16, wherein said service address comprises a multicast network address, and said fifth device is further configured to:
join a multicast group corresponding to the multicast network address so as to obtain said chosen multimedia service.

18. An apparatus according to claim 16, wherein said service address comprises a unicast network address, and said fifth device is further configured to:
communicate with a server corresponding to the unicast network address so as to obtain said chosen multimedia service.

19. An apparatus according to claim 16, wherein said service identifier comprises a domain name, and said network server includes a domain name server.

20. An apparatus according to claim 16, further comprising:
a sixth device configured to send a second query message to the network server, said second query message being used to query a multicast network address corresponding to the service identifier of the multimedia service;
a seventh device configured to receive a second response message from the network server, said second response message including the multicast network address corresponding to the service identifier of the multimedia service; and
an eighth device configured to transmit said multimedia service using said multicast network address.

21. An apparatus according to claim 20, wherein said service identifier includes a domain name, and said network server includes a domain name server.

22. A guide providing apparatus for providing multimedia service guides to user equipment in a telecommunication network, the guide providing apparatus comprising:
a first device configured to receive a service identifier, but not a service address, of each multimedia service sent from a multimedia service management device;
a second device configured to generate a multimedia service guide according to the service identifier, but not the service address, of each multimedia service;
a third device configured to receive from the user equipment a receiving request message for requesting to receive multimedia service guides, wherein the service identifier, but not the service address, of the multimedia service is used in the receiving request message; and
a fourth device configured to send the multimedia service guides to said user equipment, said multimedia service guides comprising the service identifier, but not the service address, of each multimedia service;
wherein the service identifier, but not the service address, of the multimedia service is used to send a first query message to a network server of the telecommunication network, the first query message being used to query the service address corresponding to the service identifier of a multimedia service chosen by a user, and to receive a first response message from the network server, the first response message comprising the service address corresponding to the service identifier of the chosen multimedia service.

23. A guide providing apparatus according to claim 22, wherein said service identifier includes a domain name.

24. A multimedia service guide device in a telecommunication network, comprising the guide providing apparatus according to claim 22.

* * * * *